United States Patent [19]
Hyyryläinen

[11] Patent Number: 5,797,479
[45] Date of Patent: Aug. 25, 1998

[54] LOADING/UNLOADING METHOD AND APPARATUS FOR A CRANE-ASSISTED STORAGE

[75] Inventor: Ismo Hyyryläinen, Hollola, Finland

[73] Assignee: Valmet Corporation, Helsinki, Finland

[21] Appl. No.: 675,571

[22] Filed: Jul. 3, 1996

[30] Foreign Application Priority Data

Jul. 11, 1995 [FI] Finland .................. 953386

[51] Int. Cl.[6] ........................... B65G 47/26
[52] U.S. Cl. ............ 198/456; 198/346.2; 198/785; 198/861.6
[58] Field of Search ............... 198/346.1, 346.2, 198/456, 631.1, 785, 861.6

[56] References Cited

U.S. PATENT DOCUMENTS 3,968,885  7/1976  Hassan et al. ............ 198/346.2 X
4,457,419  7/1984  Ogami et al. ............ 198/346.2 X
4,643,629  2/1987  Takahashi et al. ......... 198/346.2 X

*Primary Examiner*—James R. Bidwell
*Attorney, Agent, or Firm*—Cohen, Pontani, Lieberman, Pavane

[57] ABSTRACT

A method and apparatus for transporting paper rolls to a pickup point (8) of a crane of a crane-assisted storage area and for transferring a roll from the storage area from the pickup point (8). An upright-oriented roll is centered by a centering conveyor (5) at a point different from the pickup point (8) of the crane and the centered roll is then moved precisely to the pickup point (8). A two-part conveyor comprising the centering conveyor (5) and a delivering conveyor (9) are rotatable about a center axis so that the centering part (5) and the delivering conveyor (9) can alternatingly be aligned with the pickup point (8).

11 Claims, 1 Drawing Sheet

LOADING/UNLOADING METHOD AND APPARATUS FOR A CRANE-ASSISTED STORAGE

FIELD OF THE INVENTION

The present invention relates to a method and apparatus for transferring paper rolls to the pickup point of a crane in crane-assisted storage and for transferring the rolls retrieved from storage away from the crane's delivery point.

BACKGROUND OF THE INVENTION

Paper mills and finishing plants often require the use of buffering intermediate storage areas at different stages in production. Such storage areas typically employ an overhead crane and a storage area located within the operating range of the crane. In such storage areas, the rolls are stacked vertically on top of one another on the floor into high stacks, from which they are retrieved as required. Such crane-assisted storage is used as an intermediate storage buffer for finishing stations, and the height of the roll stacks typically reaches about 10 meters. The storage area is typically unmanned, using automatic control of the crane. The gripping mechanism of the crane is typically a suction cup mechanism, which is lowered onto the end of the vertically stacked roll. The operation of the crane is such that the gripper is lowered onto the head of a roll, which is located at a precisely determined pickup point, the gripper grasps the roll by suction, and the gripper holding the roll is raised directly upward and clamped to the transport trolley of the crane. The trolley is then moved to the desired storage position, and the roll is lowered. Subsequently, the gripper is raised and used to transfer another roll, which is then carried in a similar manner, to the pickup point and therefrom further to the conveyor system of the plant.

The gripper of the crane must be aligned very accurately with the center of the roll end both upon grasping the roll at the pickup point and when retrieving the roll from its storage position. Hence, there must be precise handling of the roll when it is delivered by the conveyor system delivered to the pickup point. For the same reason, the gripper must be hoisted fully up to the crane trolley and locked there for the duration of a transverse motion of the crane, because in a cable hoist the position information of the gripper will be lost immediately if the gripper moves laterally during the transfer operation.

In a conventional system, the rolls being transferred to storage are taken to the pickup point of the conveyor in the following manner. Initially, a roll being delivered from a slitter or other equipment travels while resting on its side on the conveyor. At the crane-assisted storage area, the conveyor is provided with a rotatable section at which the roll is moved onto a tilter. Here, the rotatable section is rotated 90° with respect to the travel direction of the conveyor to align the conveyor with the roll lying thereon so that the roll is parallel to the tilter. Next, the conveyor pushes the roll onto the tilter which, after receiving the roll, tilts upright and pushes the upright-standing roll onto a dual-lane centering slat conveyor. On this conveyor, the roll is centered using information from roll position sensors by driving the parallel lanes of the slat conveyor in suitable directions to transfer the roll to the pickup point of the crane. Centering can be accomplished using the center hole of the roll or by determining the roll's position from its outer edges. The centered roll is transferred laterally to the pickup point and picked up by the gripper of the crane. After centering, the conveyor carriage moves aside, and a single-lane slat conveyor is moved to the pickup point. This single slat conveyor is used to transfer another roll coming from the storage area to the pickup point to be transferred away to the conveyor by the tilter and the rotatable section of the conveyor.

In the above-described system, centering of the roll entering the storage area occurs at the pickup point, since the crane cannot retrieve a roll from the storage area during the centering operation. The operation of the crane apparatus is dependent on the roller conveyor operation and, respectively, the conveyor operation is dependent on the operation of the crane apparatus. Obviously, this slows down the entire system and makes the retrieve/storage steps unnecessarily clumsy. In addition, such a storage system requires a large footprint due to the laterally orthogonally moving conveyors.

SUMMARY OF THE INVENTION

The present invention provides a method and apparatus suitable for shortening the handling time of rolls at the pickup point of crane-assisted storage.

According to the present invention, centering of the roll is accomplished when the roll is in an upright position at a point separate from the pickup point. The centered roll is then transferred precisely to the actual pickup point.

According to a preferred embodiment of the present invention, at the pickup point a two-part conveyor is used, having a centering conveyor and a delivering conveyor, which is rotatable about a center axis so that centering and delivering parts of the conveyor pair can be rotated to be alternately positioned at the pickup point so that the conveyor parts are alternatingly positioned at the pickup and delivery points, respectively. Moreover, according to another embodiment of the present invention, the apparatus may have two centering conveyors which are used alternatingly at the pickup point.

The present invention offers significant benefits. The principal benefit of the present invention is the significant shortening of cycle times in crane operation. The operation of the crane is independent of the centering operation, and roll retrieval from the storage area can take place simultaneously with the centering of the roll to be transferred to the storage area. Moreover, roll transfer to the storage area and roll removal from the pickup/centering area can occur simultaneously. Hence, operation of the crane is not dependent on the conveyor system longer than the time required for the rotation of the apparatus, and the operation of the conveyor system is independent of the operation of the crane. The slow-speed roll centering operation occurring at an inching speed can be performed separately from other operations; thus, the centering operation does not slow down the roll pickup operation. Furthermore, the revolving centering/pickup apparatus requires a smaller footprint than an apparatus using a linear movement for the roll transfer.

Other objects and features of the present invention will become apparent from the following detailed description considered in conjunction with the accompanying drawing. It is to be understood, however, that the drawing is intended solely for purposes of illustration and not as a definition of the limits of the invention, for which reference should be made to the appended claims.

BRIEF DESCRIPTION OF THE DRAWING

The Figure is a top view of a presently preferred embodiment of an apparatus for crane-assisted loading and unloading of rolls according to the present invention.

DETAILED DESCRIPTION OF THE PRESENTLY PREFERRED EMBODIMENTS

Figure 1:
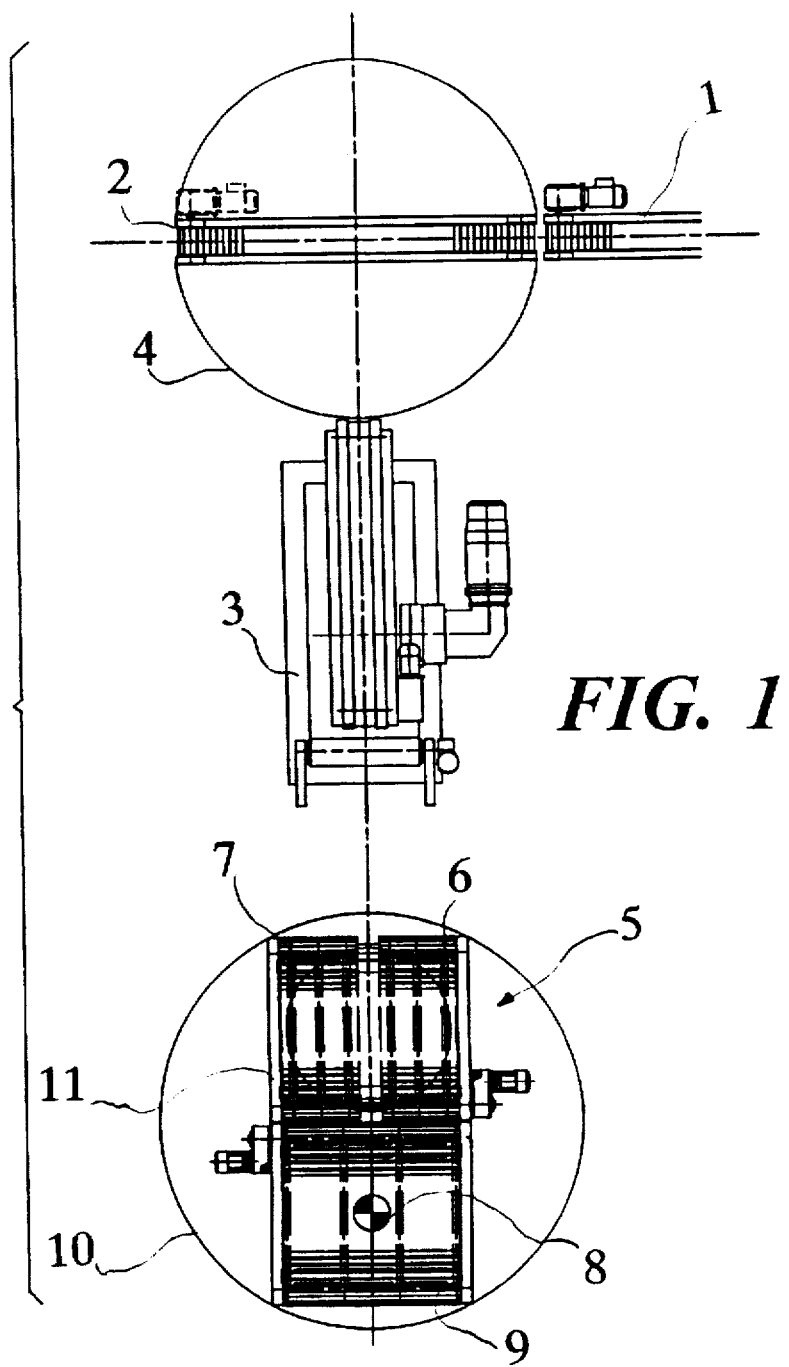

Referring to an embodiment of the present invention shown in the Figure, the rolls being transferred to the storage are taken to the pickup point of the conveyor in the same way as in a conventional system described above. A roll received from a slitter or other equipment are transported on a transport conveyor 1 laying on its side. At the crane-assisted storage area, the conveyor 1 has a rotatable section 2 to transfer the roll to a tilter 3. The radius of rotation of the rotatable conveyor section 2 is indicated in the Figure by reference numeral 4. When the roll is to be transferred to the storage area, the rotatable section 2 is rotated 90° with respect to the travel direction of the conveyor 1 to align the rotatable conveyor section 2, with the roll lying thereon, with the tilter 3. Next, the rotatable conveyor 2 transfers the roll onto the tilter 3. After receiving the roll, the tilter 3 rotates or tilts the roll upright and pushes the roll onto a dual-lane centering slat conveyor 5. On this conveyor 5, the roll is centered using information measured by roll position sensors. This information is used by a controlling means to selectively drive one or both of the parallel conveyor lanes 6, 7 of the slat conveyor 5 in suitable directions to transfer the roll to a location which, after 180° rotation of a rotatable turntable 11 on which the conveyor 5 is mounted, as discussed below, corresponds to the pickup point 8. Centering can be accomplished by using the center hole of the roll as the measured parameter or by determining the location of the outer edges of the roll.

While, before, or after the roll is being centered, a roll retrieved from storage may be placed by a crane on a single-lane delivering conveyor 9. The conveyors 5, 9 are rotated 180°, so that the centered roll to be stored is moved by the rotary movement accurately to the pickup point 8. The circle of rotation of the conveyor pair 5, 9 is denoted in the diagram by reference numeral 10. Next, the roll to be taken to the storage area is picked up by the crane. Additionally, the roll retrieved from storage to be taken to the conveyor 1 is pushed onto the tilter 3 by conveyor 9. The tilter 3 tilts the roll back into the horizontal position for transfer by the rotatable section 2 to the conveyor 1. After both rolls are removed from both conveyors 5, 9, the conveyors 5, 9 are reset by rotation by 180°, so that the centering conveyor 5 is positioned close to the tilter 3, thus ensuring that the centering conveyor 5 is ready to receive a new roll to be stored. In practice, the above-described arrangement can be implemented by mounting the conveyors 5, 9 on a rotatable turntable 11, which rotates about its center axis so that the conveyors 5, 9 are alternatingly brought to align with the pickup point 8. Alternatively, the conveyors 5, 9 can be placed on separate frames which are movable on wheels, for example, along a circular rail track.

A complete operating cycle of the apparatus according to the present invention comprises bringing a roll onto the centering conveyor 5, centering the roll, rotating the conveyor pair 5, 9, and lifting the roll off the centering conveyor 5 by the crane for transfer to storage. During this operating cycle, typically, a roll to be removed from storage is simultaneously delivered by the crane to the delivering conveyor 9 and transferred therefrom to the conveyor system 1. The system may also be used simply to deliver rolls to the storage area, or alternatively, to retrieve rolls from the storage area, whereby only one roll at a time is handled.

The apparatus may alternatively be provided with two centering conveyors 5, thus eliminating the delivering conveyor 9. In this embodiment, when the conveyors are rotated 180°, a vacant centering conveyor is immediately available at the tilter 3. Furthermore, the dual-lane centering slat conveyor 5 may be replaced by other types of centering equipment such as a belt or slat conveyor which can be shifted laterally by means of an actuator. Using this type of centering conveyor, the centering operation is performed by driving the conveyor forward or backward and then shifting the entire conveyor laterally.

Thus, while there have been shown and described and pointed out fundamental novel features of the invention as applied to a preferred embodiment thereof, it will be understood that various omissions and substitutions and changes in the form and details of the device illustrated, and in its operation, may be made by those skilled in the art without departing from the spirit of the invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawing is not necessarily drawn to scale but that it is merely conceptual in nature. It is the intention, therefore, to be limited only as indicated by the scope of the claims appended hereto.

What is claimed is:

1. An apparatus for transporting a roll to be stored from a transport conveyor to a pickup point of a crane of a crane-assisted storage apparatus, comprising:

a first conveyor operable to receive a roll from the transport conveyor and for centering the roll to be stored at first centering position;

a second conveyor operable to at least one of (a) receive a roll from the transport conveyor and center the roll to be stored at a centering position, and (b) receive a roll delivered by the crane from storage; and a means for alternatingly moving the first conveyor and the second conveyor to the pickup point of the crane so that, when the first conveyor is at the pickup point of the crane, the centering position of the roll received by the first conveyer to be stored is centered at the pickup point of the crane and the second conveyor is positioned to at least one of (a) receive a roll from the transport conveyor and (b) transfer a roll delivered from storage to the transport conveyor.

2. The apparatus of claim 1, wherein the moving means comprises a rotatable turntable and wherein said first and second conveyors are mounted on said rotatable turntable.

3. The apparatus of claim 1, wherein the moving means comprises:

a frame having wheels rotatably mounted thereto; and a rail, the wheels of the frame riding on said rail; and wherein said first and second conveyors are mounted on said frame.

4. The apparatus of claim 1, wherein said second conveyor is operable to receive a roll from the transport conveyor and for centering the roll to be stored at a centering position, and wherein said moving means is operable to move the second conveyor to the pickup point of the crane so that, when the second conveyor is at the pickup point of the crane, the centering position of the roll received by the second conveyer to be stored is centered at the pickup point of the crane.

5. The apparatus of claim 4, wherein the moving means comprises a rotatable turntable and wherein said first and second conveyors are mounted on said rotatable turntable.

6. The apparatus of claim 1, wherein the second conveyor is operable to receive a roll delivered by the crane from storage when said second conveyor is at the pickup point of the crane and for transferring the roll delivered from storage to the transport conveyor when said first conveyor is at the pickup point of the crane.

7. The apparatus of claim 6, wherein the moving means comprises a rotatable turntable and wherein said first and second conveyors are mounted on said rotatable turntable.

8. The apparatus of claim 1, further comprising a roll tilting means for standing a roll on an end thereof, said roll tilting means being interposed between the transport conveyor and said first and second conveyors.

9. A method for transporting a roll to be stored from a transport conveyor to a pickup point of a crane of a crane-assisted storage apparatus and for removing a roll from storage to the transport conveyor, comprising:

receiving on a first conveyor a roll to be stored from the transport conveyor;

centering the received roll to be stored at first centering position on the first conveyor;

receiving at the pickup point on a second conveyor a roll delivered by the crane from storage; and simultaneously moving the first and second conveyors after said conveyors have received their respective rolls so that the first conveyor is positioned at the pickup point of the crane, and the second conveyor is positioned to transfer a roll delivered from storage to the transport conveyor.

10. The method of claim 9, wherein said first and second conveyors are mounted onto a rotatable turntable and said moving step comprises rotating the turntable.

11. The method of claim 9, further comprising standing the roll to be stored on an end thereof before the roll is received by the first conveyor.

* * * * *